Feb. 28, 1928.  1,660,613

A. J. HAYDEN
LUGGAGE CARRIER FOR VEHICLES
Filed Jan. 28, 1927  3 Sheets-Sheet 1

Feb. 28, 1928.

A. J. HAYDEN 1,660,613

LUGGAGE CARRIER FOR VEHICLES

Filed Jan. 28, 1927     3 Sheets-Sheet 2

Inventor
ALFRED J. HAYDEN,
Attorneys.

Feb. 28, 1928.
A. J. HAYDEN
1,660,613
LUGGAGE CARRIER FOR VEHICLES
Filed Jan. 28, 1927    3 Sheets-Sheet 3
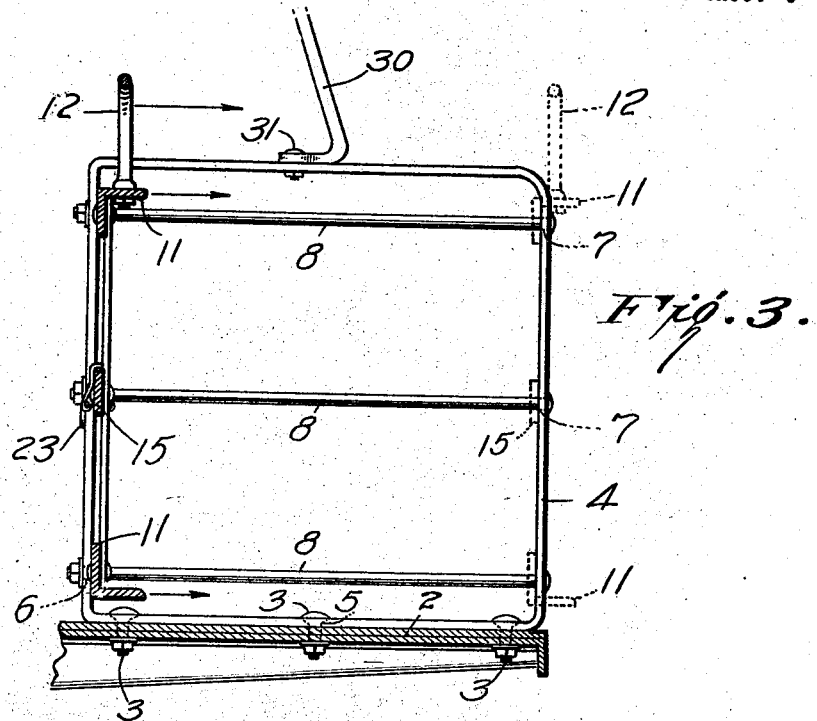
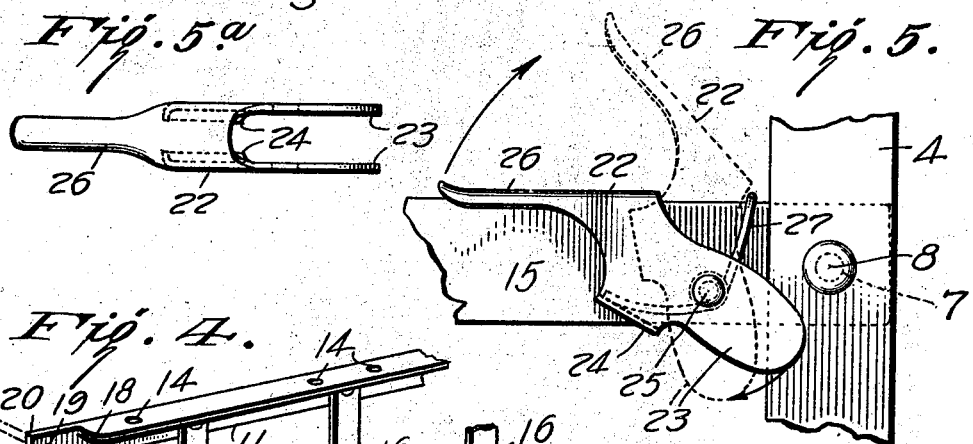
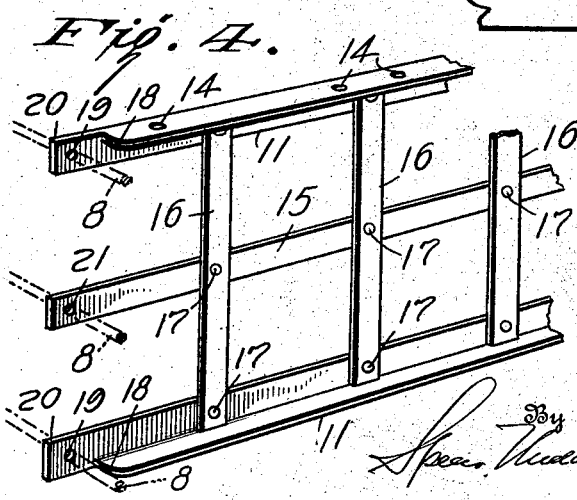
Inventor
ALFRED J. HAYDEN,
By
Attorneys Patented Feb. 28, 1928.

1,660,613

UNITED STATES PATENT OFFICE.

ALFRED JOHN HAYDEN, OF DAYTONA BEACH, FLORIDA.

LUGGAGE CARRIER FOR VEHICLES.

Application filed January 28, 1927. Serial No. 164,291.

My present invention relates to luggage carriers for automobiles or the like, and particularly to that type of carrier adapted to be secured to or placed on the running board of such a vehicle for the purpose of holding bags or luggage between itself and the body of the vehicle.

The primary object of my invention is to provide such a device which will be efficient in operation, cheap to manufacture, easily installed, and which may be slid back out of the way when not in use which will obviate the necessity of removal from the vehicle.

To this end my invention consists in supplying certain instrumentalities whereby two rectangular brackets are bolted solidly to the usual running board to occupy a vertical position. Each bracket is equipped with three or more horizontal rods for the purpose of receiving the ends of an especially designed rack or retaining wall.

The rack or retaining wall is provided with corresponding holes at each end of its bars so as to connect onto the said horizontal rods, so that said rack or retaining wall may occupy a vertical position either at the outer edge of the running board or back next to the body of the vehicle, the rack or retaining wall being adapted to slide back and forth on the said rods as desired.

A cam catch is attached to each end of the rack or retaining wall, and is utilized to prevent said rack from moving out of place either when it is in position at outer edge of the running board or when slid back out of the way next to the body of the vehicle.

When the rack or retaining wall is slid forward to outer edge of the running board, the luggage may be placed in the pocket thus formed between the rack or retaining wall and the body of the vehicle.

A rod hand-hold is attached at its bottom end to the top of the right bracket by means of a bolt, said bracket being placed at a point directly between the two doors. The top end of the rod is attached to the standard of the car body which is between the two doors by means of a screw. The purpose of this rod is to provide a stay or brace for said bracket and act as a handhold for a passenger either in entering or stepping out of the vehicle.

I have illustrated a certain form of device in the drawings, but it is understood that this is merely the present preferred form and that various changes may be made in the device shown and described without departing from the spirit of my invention.

In these drawings:

Fig. 3 is a transverse section substantially on line 3—3 of Fig. 1.

Fig. 4 is a detail view of the rack or retaining wall, consisting of two angle bars, one at the top and one at the bottom, and one center flat bar, with flat bar uprights.

Fig. 5 is a view of the catch in locking and unlocking positions, the latter shown in dotted lines.

Figure 1:
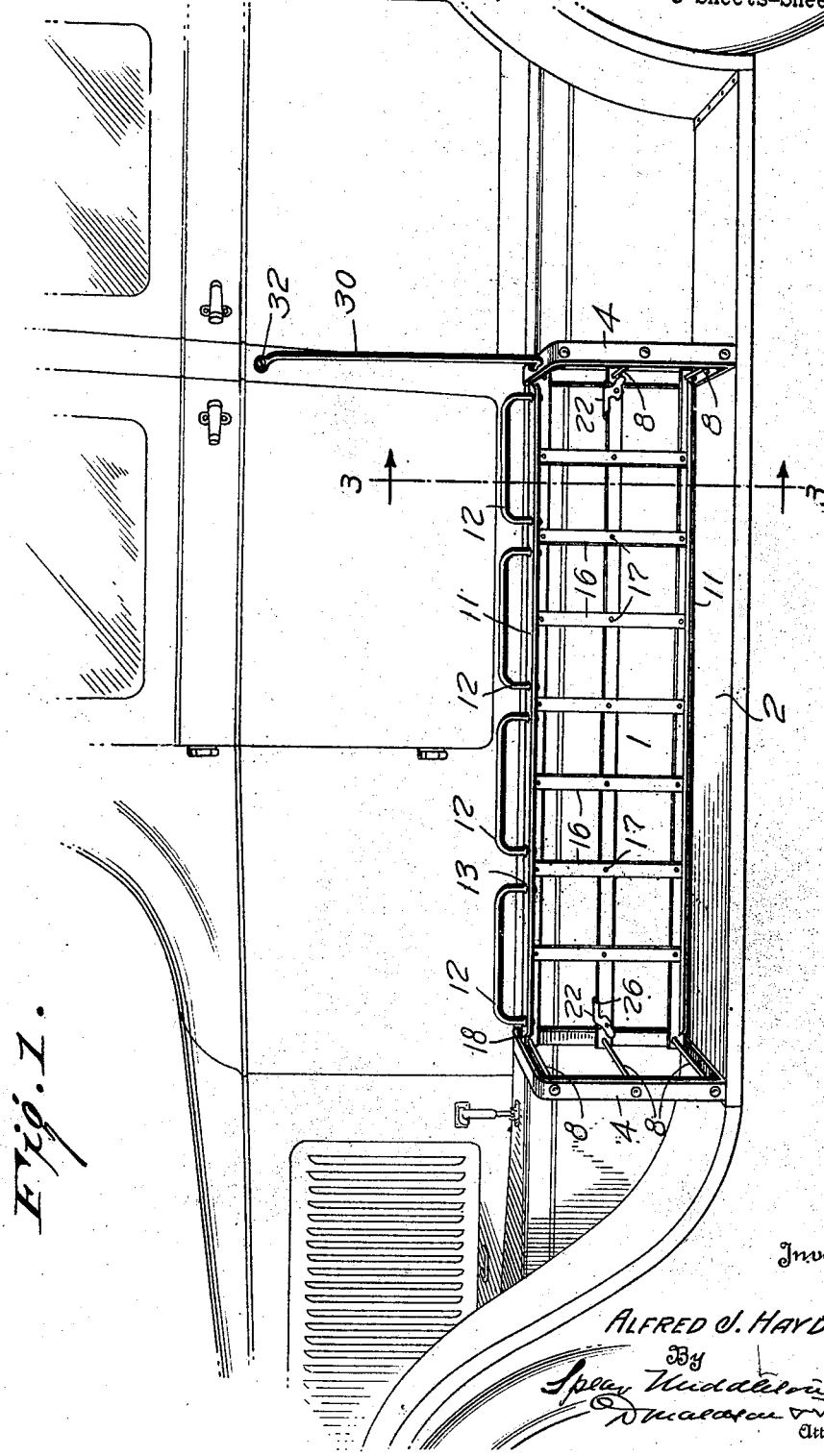
Figure 1 is a perspective view showing the rack or retaining wall in out of the way position next to the body of vehicle.

Fig. 5$^a$ is a detail plan view of the catch.

Fig. 5$^b$ is a detail of the V-shaped coil spring.

Referring now to the drawings, I have shown the automobile luggage carrier at (1) supported upon the usual running board (2) and is secured solidly thereto by means of bolts (3). The rectangular brackets (4) are provided with three counter sunk bolt holes at the bottom portions of each bracket at (5) and three bolt holes in the back upright portions (6) and three likewise in the front upright portions (7) for the purpose of receiving the six horizontal rods (8) which allows the free movement of the rack or retaining wall portion back and forth as desired.

The rack or retaining wall (10) is composed of angle bar (11) at the top and bottom. Four or more parts of U-bolt shape of round material at (12) are preferably attached to top side of the top angle bar at (13), said bar being provided with eight or more bolt holes (14) to receive the ends of said U-bolts, and is fastened thereto by means of bolt taps, the U-bolt being for the purpose of creating more depth to the luggage carrier rack or retaining wall. The U-bolts 12 may be omitted if desired without detracting from the usefulness of the device. The balance of the rack or retaining wall is constructed as shown of a flat center cross bar (15) with several vertical flat bars (16) fastened to the angle bars and center cross bar by means of rivets (17), the ends of the outer flanges (18) of the angle bars being cut away for the purpose of allowing the flat portions of said bars to fit firmly against the inside of the upright portions of the rectangular brackets. Suitable holes (19) are provided in the ends of angle bars at (20) and in the center cross bar at (21) to receive the horizontal rods.

A forked catch (22) is provided with two lugs or prongs (23) with a lip on each side of lug body at (24) turned inward so as to leave a suitable space between the two lips for the purpose of holding the catch in proper position in its action, and also so as to provide a bearing for the ends of the U-shaped coil springs. One of said catches is attached near each end of the center cross bar by means of a bolt (25). The opposite end portion of the catch has a lift projection (26) so that by pulling this upward the catch is released from its locking position against the upright of either the front or back portions of the said bracket.

A U-shaped coil spring is provided (27) and as shown has three coils at each side of U which fits over a bolt so as to leave half of the spring on each side of the body of the center cross bar (15). The ends of said spring bear on the inside part of the lips, and the center part of spring bears over and on top edge of said center cross bar.

The said catches are provided for the purpose of either holding the rack or retaining wall when in position at outer edge of running board or when back out of the way next to the body of the vehicle.

Figure 2:
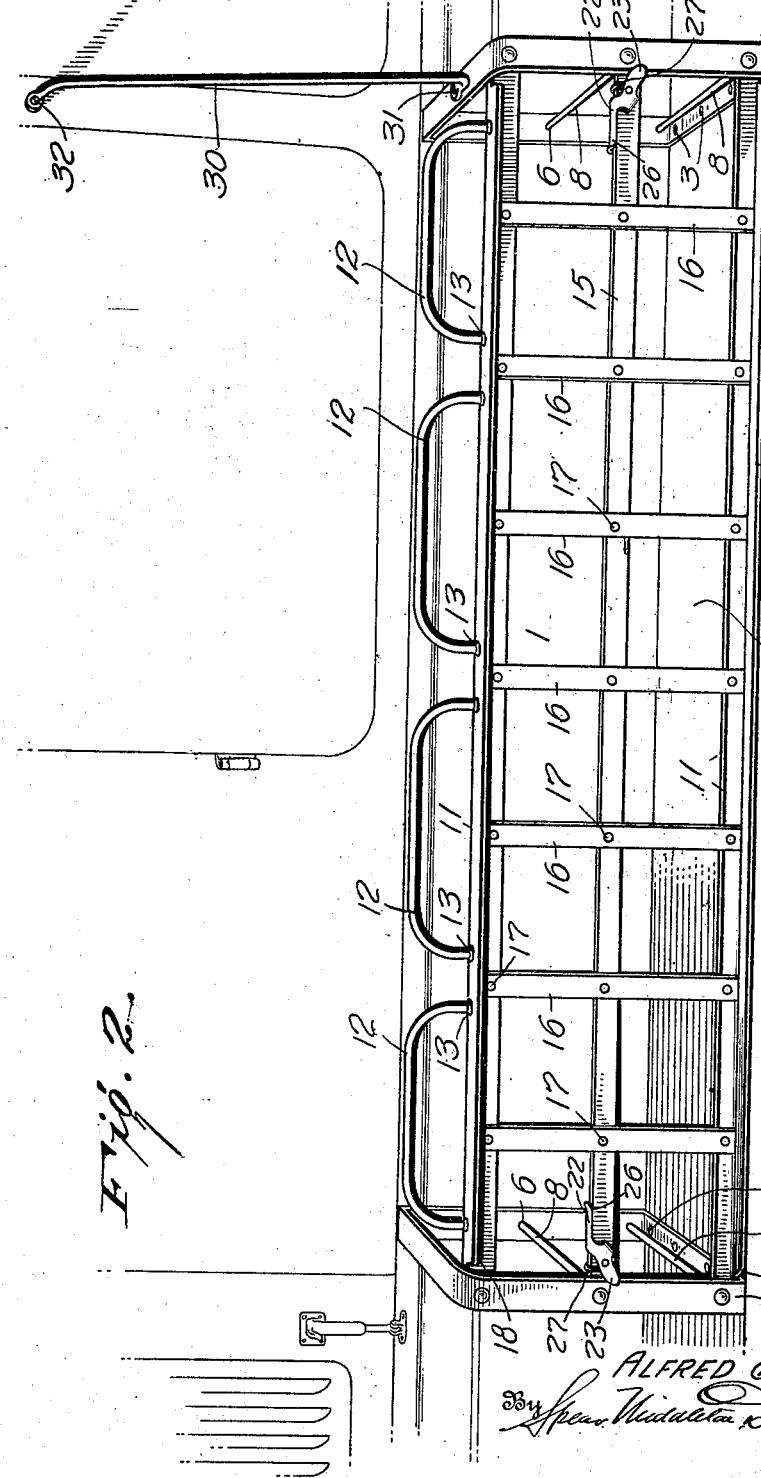
Fig. 2 is a perspective view showing the rack or retaining wall slid out to the outer edge of running board.

A rod hand-hold is provided (30) and is attached at its bottom end to the top of right hand bracket in Figs. 1 and 2 by means of a bolt (31), said bracket being placed at a point directly between the two doors. The top end of said rod is attached by means of a screw (32) to the standard of the car body between the two doors, for the purpose of providing a brace for said bracket and to act as a hand-hold to a passenger either in entering or in leaving the vehicle.

All parts of the device are to be preferably made of metal, preferably of steel.

I claim:

1. A luggage carrier, for a vehicle of the type provided with a running board and having two doors on each side with a standard of the body portion between said doors, comprising a pair of spaced rectangular vertically disposed brackets adapted to extend transversely of the running board of the vehicle, and one of which is adapted to be fixedly secured to said running board transversely opposite the standard of the body portion, the other bracket being adapted to be secured near an extremity of the running board, a vertically disposed retaining wall member extending between and slidably mounted upon said brackets for adjustment toward or away from the vehicle body, said rectangular bracket opposite the standard of the vehicle being so disposed that when the retaining wall member is adjusted in against the vehicle body, free access is had to either door and to the running board for loading passengers, and a vertical hand-hold member secured at its lower end to the bracket opposite the standard of the body and secured at its upper end to the standard.

2. In a device of the class described, a pair of spaced rectangular vertically disposed bracket members comprising the end retaining walls of a luggage carrier, a vertically disposed retaining wall member extending between said brackets at right angles thereto and movably mounted upon said bracket members, said retaining wall member having a plurality of holes in each of its ends, each of said bracket members having horizontally disposed slide rods transverse to said retaining wall member and adapted to pass through said holes to form a plurality of slidable connections, and catch means mounted on the retaining wall member and adapted to engage the brackets for holding said retaining wall member in adjusted position at either extremity of the said slide rods.

3. Apparatus according to claim 2, in which said retaining wall member is an openwork frame comprising an upper and a lower horizontal angle bar with an intermediate horizontal flat bar, said bars being connected by a plurality of upright flat bars, and said horizontal bars extending beyond an upright bar at each end of the frame, said catch means comprising forked catch members, one at each end of the intermediate horizontal bar embracing said bar with the prongs of the fork, one on each side of said bar and the juncture of the prongs above the bar, said catch members being pivotally mounted upon the bar by a pivot member extending through the prongs and through the bar, whereby the catch members are adapted to be swung about their pivots to engage the vertical portions of the rectangular brackets with the fork, said catch members having bearing surfaces for a spring on each prong of the fork, but on the side of the pivot opposite to the bracket engaging portion of the prong, and U-shaped springs placed one over each end of the bar, said springs having coils near each end through which the said pivot member passes and having their ends resting upon the bearing surfaces of the catch members to stress them toward locking position.

In testimony whereof, I affix my signature.

ALFRED JOHN HAYDEN.